(12) United States Patent
Valembois

(10) Patent No.: US 11,590,714 B2
(45) Date of Patent: Feb. 28, 2023

(54) METHOD FOR PRODUCING A PART MADE OF COMPOSITE MATERIAL, AND SO OBTAINED COMPOSITE PART

(71) Applicant: CONSEIL ET TECHNIQUE, Lauzerville (FR)

(72) Inventor: Guy Valembois, Lauzerville (FR)

(73) Assignee: CONSEIL ET TECHNIQUE, Lauzerville (FR)

( * ) Notice: Subject to any disclaimer, the term of this patent is extended or adjusted under 35 U.S.C. 154(b) by 0 days.

(21) Appl. No.: 16/622,498

(22) PCT Filed: Jun. 13, 2018

(86) PCT No.: PCT/FR2018/051397
§ 371 (c)(1),
(2) Date: Dec. 13, 2019

(87) PCT Pub. No.: WO2018/229437
PCT Pub. Date: Dec. 20, 2018

(65) Prior Publication Data
US 2021/0146639 A1    May 20, 2021

(30) Foreign Application Priority Data
Jun. 13, 2017  (FR) ...................... 1755289

(51) Int. Cl.
*B29C 70/54*   (2006.01)
*B29C 70/32*   (2006.01)
B29C 70/22   (2006.01)
B29C 70/52   (2006.01)
(Continued)

(52) U.S. Cl.
CPC .............. *B29C 70/32* (2013.01); *B29C 70/54* (2013.01); *B29C 70/222* (2013.01); *B29C 70/525* (2013.01); *B29K 2101/12* (2013.01); *B29K 2105/0809* (2013.01)

(58) Field of Classification Search
CPC ..................................................... B29C 70/222
See application file for complete search history.

(56) References Cited

U.S. PATENT DOCUMENTS 4,137,354 A * 1/1979 Mayes, Jr. ............ B29C 53/564
                                                        156/175
4,460,531 A * 7/1984 Harris ................... B29C 70/347
                                                        156/173
(Continued)

FOREIGN PATENT DOCUMENTS

DE        2945469 A1   5/1981
DE   102010025940 A1   1/2012
(Continued)

*Primary Examiner* — Jeffry H Aftergut
(74) *Attorney, Agent, or Firm* — Craft Chu PLLC; Andrew W. Chu

(57) ABSTRACT

A method for producing a part made of composite material includes adding a thermoplastic or thermosetting matrix around a preform of a reinforcing fiber mesh made by filament winding around the spurs or the like of a frame. There is winding in addition to the fibers on one or several reels within the matrix, the axes of the spurs or the like and those of the one or more reels having different orientations, so as to provide the mesh of fibers with a three-dimensional shape.

6 Claims, 2 Drawing Sheets

(51) Int. Cl.
   *B29K 101/12*    (2006.01)
   *B29K 105/08*    (2006.01)

(56) References Cited

U.S. PATENT DOCUMENTS

| | | | | |
|---|---|---|---|---|
| 4,552,035 A | * | 11/1985 | Skipper | F16C 7/026 |
| | | | | 74/581 |
| 5,271,300 A | | 12/1993 | Zurbuchen | |
| 2003/0010424 A1 | | 1/2003 | Lindenau | |

FOREIGN PATENT DOCUMENTS

| | | |
|---|---|---|
| EP | 0572752 A1 | 12/1993 |
| FR | 3032144 A1 | 8/2016 |
| WO | 0164570 A1 | 9/2001 |
| WO | 2011054975 A1 | 5/2011 |
| WO | 2015066407 A1 | 5/2015 |

\* cited by examiner

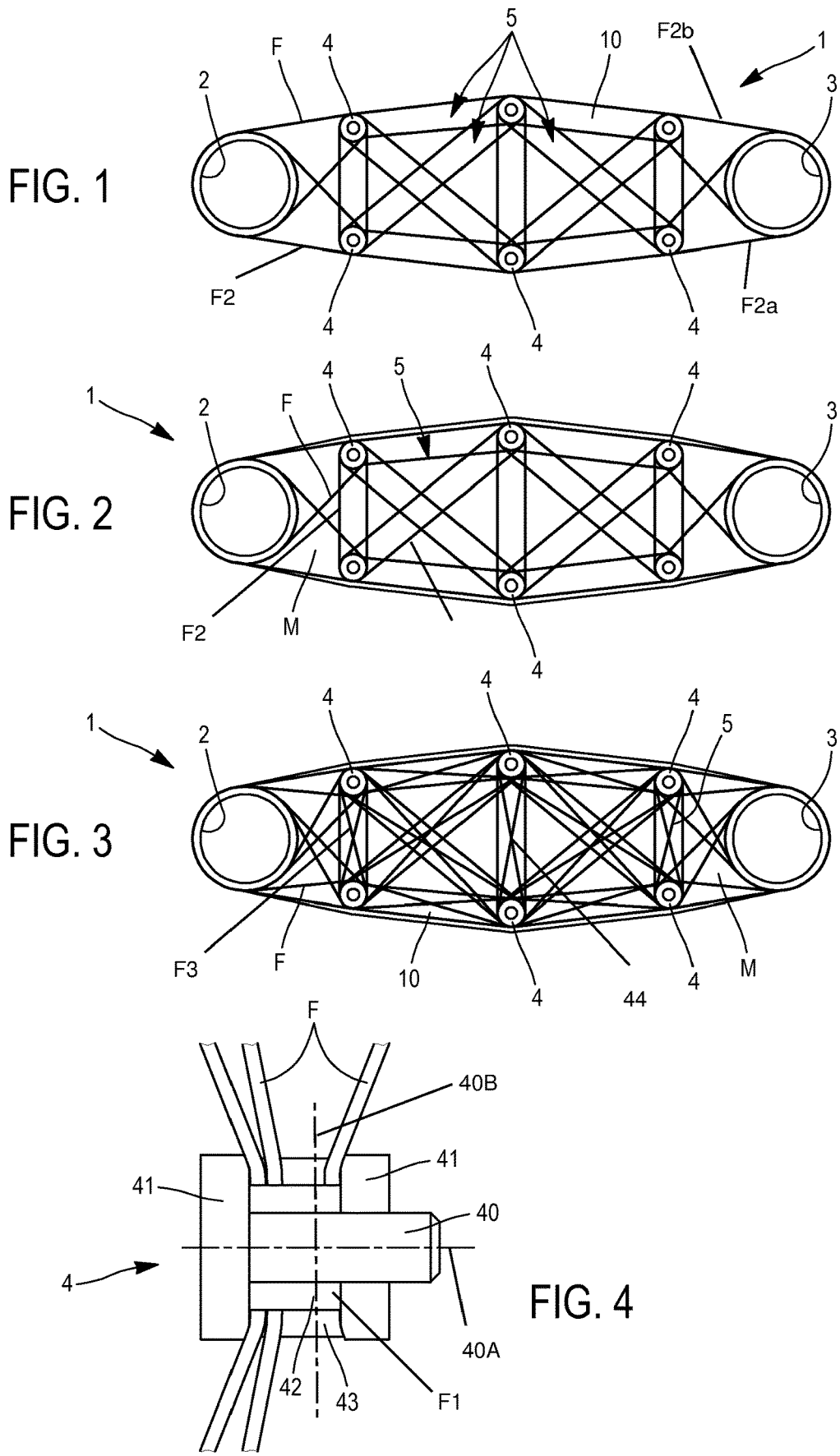

METHOD FOR PRODUCING A PART MADE OF COMPOSITE MATERIAL, AND SO OBTAINED COMPOSITE PART

CROSS-REFERENCE TO RELATED APPLICATIONS

See Application Data Sheet.

STATEMENT REGARDING FEDERALLY SPONSORED RESEARCH OR DEVELOPMENT

Not applicable.

THE NAMES OF PARTIES TO A JOINT RESEARCH AGREEMENT

Not applicable.

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not applicable.

STATEMENT REGARDING PRIOR DISCLOSURES BY THE INVENTOR OR A JOINT INVENTOR

Not applicable.

BACKGROUND OF THE INVENTION

1. Field of the Invention

The present invention relates to the field of parts made of composite material, comprising a fiber-reinforced thermoplastic or thermosetting matrix such as, non-restrictively, fittings.

2. Description of Related Art Including Information Disclosed Under 37 CFR 1.97 and 37 CFR 1.98

It should be noted that the term fiber refers to all the forms in which the reinforcing fibers may be present, and namely, but non-restrictively, strands, ribbons or cords of reinforcing fibers.

Such parts made of composite material, like those described in DE 29 45 469, FR 3032144, DE 102010025940 and WO 2015/066407 for example, have a mesh structure obtained by winding resin-impregnated fibers on a frame from which protrude studs, so as to permit to convey and stretch the fibers between said studs in order to direct them preferably according to the directions of the stress.

Because of the arrangement of the spindles, the fibers extend in substantially parallel or perfectly parallel planes, as in WO 2015/066407, which results into the so obtained mesh structure not to be capable of optimally reacting to the stresses exerted in directions other than those parallel to those planes.

It is known that the reinforcing fibers have proven their effectiveness in the possibility of producing mechanical structures that are both resistant and light. This efficiency is due to the fact that the bars forming the mesh are subjected to tensile or compressive stresses, which stresses are particularly suited for exhibiting uniform stresses in the straight sections of the bars.

It is well known that in the composite materials the compressive strength of the fibers is more moderate than the tensile strength of same, in particular because of the problem of buckling of the fibers under compression, global or local buckling of the fibers.

This is more obvious when crossing the fibers at the level of the intermediate knots, the compressive stress inevitably causing the loosening of the fiber junctions.

In FR 3032144 the fibers are arranged as a mesh in a first preform, which is compacted in order to form a second preform capable of being molded. The compaction phase induces the non-straightness of the bars forming the mesh. In addition, the crushing of these bars in their end creates complex shapes capable of inducing parasitic stresses in the bars.

In addition, during the crushing phase, the fibers are either overstretched, which leads to significant internal stresses in the final part, or under-stretched, which generates their pleating.

In order to be able to stress thin fibers in compression, the following three conditions must be complied with: the fibers must be perfectly rectilinear, they must be locked in their deformation or displacement transversally to their main direction, and the introduction of the mechanical action into the fibers must occur without introducing any parasitic stress.

In the case of a mesh structure formed by an interweaving of fibers, the traction is well taken up by the fiber network since this stress consolidates the knot formed by the crossing of fibers.

On the other hand, the compression of the fibers tends to loosen the knot. The curved shape of the fiber due to the crossing thereof promotes the local bending of the fiber put under compression and thus the global buckling of the fiber.

BRIEF SUMMARY OF THE INVENTION

The object of the present invention is to cope with the various aforementioned drawbacks by providing a method for producing a part made of composite material, and more particularly for producing the mesh structure of a part made of composite material, while complying with the three conditions defined above, as well as the so obtained part, so that the latter has a compressive mechanical strength.

The method for producing a part made of composite material according to the invention consists in adding a thermoplastic or thermosetting matrix around a preform comprised of a reinforcing-fiber mesh made by a filament winding around the spurs or the like of a frame, and it is characterized in that it consists in addition in winding the fibers on one or several reels inside the matrix, the axes of said spurs or the like and those of said one or several reels having different orientations, so as to provide said fiber mesh with a three-dimensional shape.

According to an additional feature of the method according to the invention, windings are made between pairs of internal reels in order to form bars forming the mesh structure.

According to another additional feature of the method according to the invention, the windings between two reels of a pair of reels are made by passing on one side or the other of the one and/or the other reel, so as to create, within the bar that connects said two reels, at least one crossing of fibers.

According to another additional feature of the method according to the invention, prior to starting the winding of the fiber on a reel to another reel for creating a bar, one or several complete windings are made around the reel.

According to another additional feature of the method according to the invention, one or several complete consolidation windings are made around the reel between the fibers that form the bars, during and/or after the carrying out of the windings for creating said bars.

According to another additional feature of the method according to the invention, the addition of a thermoplastic or thermosetting matrix around the preform is carried out either by soaking, or by spraying, or by overmolding.

Advantageously, the reels may also constitute interface forms of the final part.

The internal reel or reels permit to create intermediate knots, permitting a change in direction of a plane to another non-parallel one, and thus to make complex global three-dimensional shapes.

The winding process can be judiciously robotized, it permits to perform the deposition of fibers while maintaining a tension, which is a guarantee for the straightness of these fibers.

This local winding can be separated into a phase of preliminary creation of the shape of the knot through an initial winding around the reel serving to provide the knot with resistance and a minimum rigidity, then windings for creating the consolidated bars through consolidation windings performed during or after the windings for creating the bars.

In case of using fiber-impregnating thermoplastic resin, the winding is performed by heating the fiber, then cooling the whole of the preform in order to provide it with a global cohesion.

In case of using fiber-impregnating thermosetting resin, the winding is performed by sufficiently heating the fiber, then cooling the whole of the preform in order to provide it with a global cohesion with, if necessary, a transition to a crosslinking temperature.

The thus formed preform is then surrounded by a matrix, preferably but not exclusively, made of the same material as the one used for impregnating the fibers, either by soaking in a bath of material constituting the matrix, at the temperature recommended to have sufficient fluidity to cover the fiber mesh, or by spraying or by molding in a mold, the filling volume of the part being injected in addition to the mesh previously arranged in the mold.

In addition to the method according to the invention permitting to obtain a great straightness of fibers, it permits, as a result, to use less reinforcing fibers.

In addition, it permits to make lighter and hence cheaper parts.

The advantages and features of the method according to the invention, and of the parts that it permits to implement, will more clearly appear from the following description, which refers to the attached drawing, which represents several non-restrictive embodiments of same.

BRIEF DESCRIPTION OF THE SEVERAL VIEWS OF THE DRAWINGS

In the attached drawing:

FIGS. 1 and 2 show schematic views of a planar connecting rod during its manufacturing by the method according to the invention.

FIG. 3 shows a schematic view of a variant of the same connecting rod.

FIG. 4 shows a partial schematic and cross-sectional view of a portion of the same connecting rod.

DETAILED DESCRIPTION OF THE INVENTION

Figure 5:
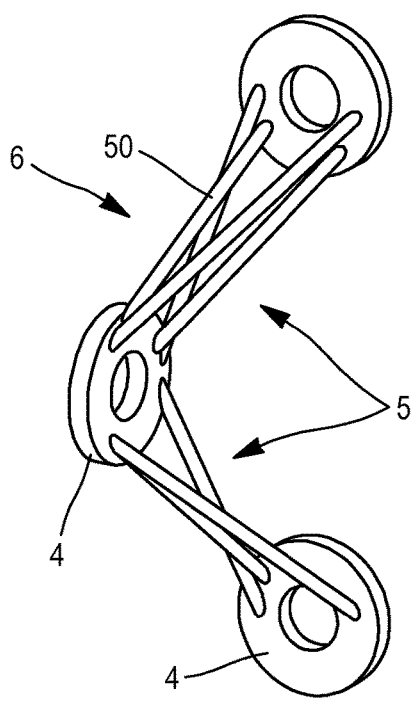
FIGS. 5, 6, 7 and 8 show schematic perspective views of parts made of composite material manufactured according to the method.

When referring to FIGS. 1 and 2, we can see a planar connecting rod 1 made of composite material manufactured by implementing the method according to the invention.

More specifically, FIG. 1 shows a first step of manufacturing a mesh structure 10 of reinforcing fibers F, made by filament winding.

The fiber F, which may consist, without limitation, of strands, ribbons or cords of reinforcing fibers, is wound between two pulleys 2 and 3 for forming the two eyecups of the connecting rod 1, and carried by a frame, not shown.

According to the invention, the frame also carries reels 4, or intermediate pulleys, arranged between the pulleys 2 and 3, and on which the fiber F is also wound.

These reels 4, or intermediate pulleys, permit to create, between each pair of reels 4, bars 5 that form the mesh structure 10.

In FIG. 2, we can see a next step of the method, which consists in molding on the mesh structure 10 a thermosetting or thermoplastic matrix M, as the case may be, the reels 4 and the bars 5 being embedded in this matrix M.

When referring now to FIG. 3, we can see that the method according to the invention allows multiple possibilities of making the mesh structure 10, especially when the reels 4 have a determined diameter.

It is thus possible, when making a change in direction of the winding on a spool 4, to pass on one side or the other of the latter, to stretch fibers F obliquely in a bar 5.

The reels 4 permit to vary the direct or crossed, single or multiple reels, so as to permit an optimization of the fiber mesh.

It should be noted that the molding of the matrix M is carried out in a mold, not shown, and that in the latter may be arranged, before molding, several preforms each comprised of a mesh structure 10.

It should also be noted that in FIGS. 1, 2 and 3 the reels 4 may, according to the invention, as cannot be seen in a top view, not be in the same plane, so that the bars 5 are inclined in planes (reel plane 40B) that are not perpendicular to the axes 40A of the reels 4.

When referring to FIG. 4, we can see a reel 4, or intermediate pulley. This reel 4 comprises, in this non-restrictive embodiment, a shaft 40 and two lateral flanges 41.

It will be understood that such a reel 4 permits the fibers F to extend in planes (reel plane 40B) that are not perpendicular to the axis of the shaft 40.

According to the invention, the winding of the fiber F (initial fibers F1, bar fibers F2 (a first bar fiber F2a, a second bar fiber F2b), and consolidation fibers F3) at the level of such a reel 4 is divided into several phases. In a first step, an initial winding or initial wind 42 is performed around the shaft 40 between the flanges 41, in order to provide the knot 44 to be formed with the resistance and the minimum rigidity, and then a winding is performed to another reel 4 for creating the bars 5. Then, windings for a final or consolidation wind 43 around the shaft 40 and between the fibers F that form the bars 5 are performed during and/or after the creation of the windings for creating the bars 5.

The aim of these windings is to block the deformation in compression in the wound area, but also to reduce, according to the need, the length of the bars 5 prone to buckling.

Figure 6:
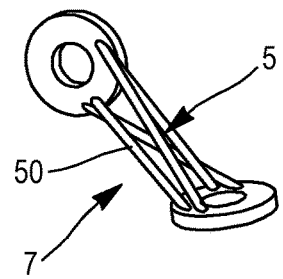
Figure 7:
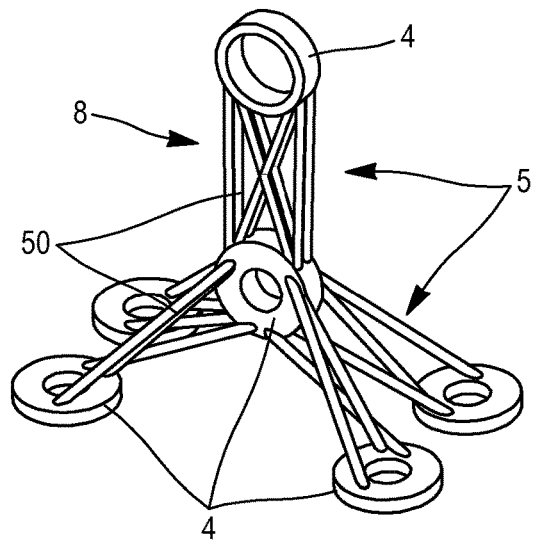
Figure 8:
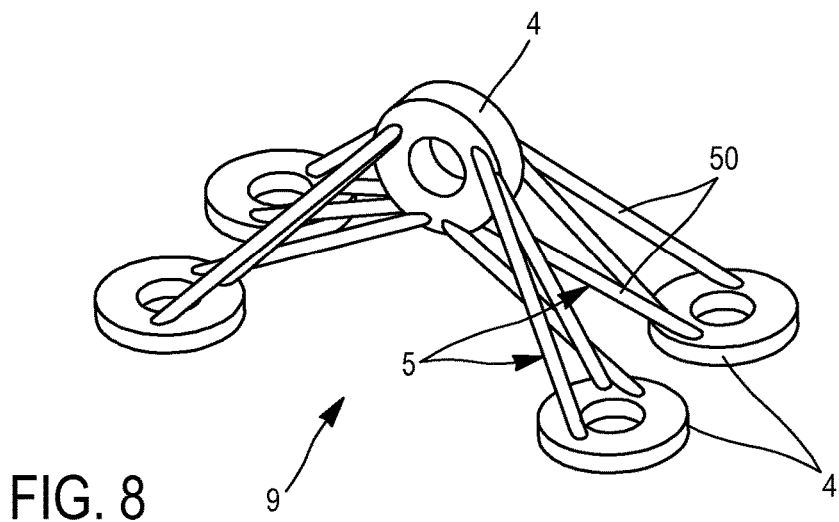

When referring to FIGS. 5, 6, 7 and 8, we can see composite parts 6, 7, 8 and 9, respectively, made by implementing the method according to the invention.

It can be observed that the winding of the fibers can be made between two reels 4 with non-parallel axes. The so obtained winding is globally twisted while complying with the straightness of the beams 50 of fibers forming the bars 5.

This twisting associated with the choice of the diameter of the reels 4 permits to create a three-dimensional fiberizing potentially having out-of-plane resistance.

It should be noted that some reels 4 of these parts 6, 7, 8 and 9 constitute interface forms.

It is possible to create a three-dimensional fiber mesh suitable for optimizing the fiberizing of a volume part having a mechanical strength during phases of compression of the bars 5 forming the mesh 10.

I claim:

1. A method for composite material, the method comprising the steps of:
    assembling a plurality of reels, each reel of said plurality of reels being comprised of a shaft along an axis so as to define a reel plane perpendicular to said axis and a plurality of lateral flanges at each end of said shaft, each reel of said plurality of reels having one side and an opposite side;
    winding a plurality of initial fibers around a respective shaft of a corresponding reel of said plurality of reels between a respective plurality of lateral flanges of said corresponding reel of said plurality of reels under tension so as to form an initial wind with a knot with initial resistance, an initial reel plane, and an initial rigidity;
    winding a plurality of bar fibers from said initial wind to another reel so as to form a bar under tension with bar resistance, a bar reel plane, and a bar rigidity after said knot, said bar reel plane being different from said initial reel plane, said bar resistance being different from said initial resistance, said bar rigidity being different from said initial rigidity, said plurality of bar fibers being comprised of a first bar fiber on said one side of said corresponding reel and a second bar fiber on said opposite side of said corresponding reel;
    winding a plurality of consolidation fibers around said respective shaft of said corresponding reel of said plurality of reels so as form a consolidation wind, after the initial wind and after winding said first bar fiber of said bar, said initial wind, said bar, and said consolidation wind forming a reinforcing-fiber mesh; and
    adding a matrix around said reinforcing-fiber mesh so as to produce part with a three-dimensional shape based on said initial reel plane and said bar reel plane.

2. The method for composite material, according to claim 1, wherein the step of winding said plurality of bar fibers comprises the steps of:
    passing said first bar fiber on said one side of the said corresponding reel to said another reel; and
    passing said second bar fiber from said another reel to said opposite side of the said corresponding reel.

3. The method for composite material, according to claim 2, wherein initial tension between said corresponding reel and said another reel is maintained by said knot with said initial resistance and said initial rigidity.

4. The method for composite material, according to claim 1, wherein the step of winding said plurality of initial fibers around said respective shaft of said corresponding reel of said plurality of reels between said respective plurality of lateral flanges of said corresponding reel of said plurality of reels so as to form an initial wind is comprised of:
    winding said plurality of initial fibers completely around said respective shaft of said corresponding reel of said plurality of reels between said respective plurality of lateral flanges of said corresponding reel of said plurality of reels.

5. The method for composite material, according to claim 1, wherein in the step of adding said matrix is comprised of one of a group consisting of: soaking the mesh, spraying the mesh, and overmolding the mesh.

6. The method for composite material, according to claim 1, wherein the step of winding said plurality of consolidation fibers around said respective shaft of said corresponding reel of said plurality of reels is after winding said second bar fiber of said bar.

* * * * *